May 3, 1960
D. E. BULLIS ET AL
2,935,595
STUD WELDING APPARATUS
Filed March 24, 1958
2 Sheets-Sheet 1
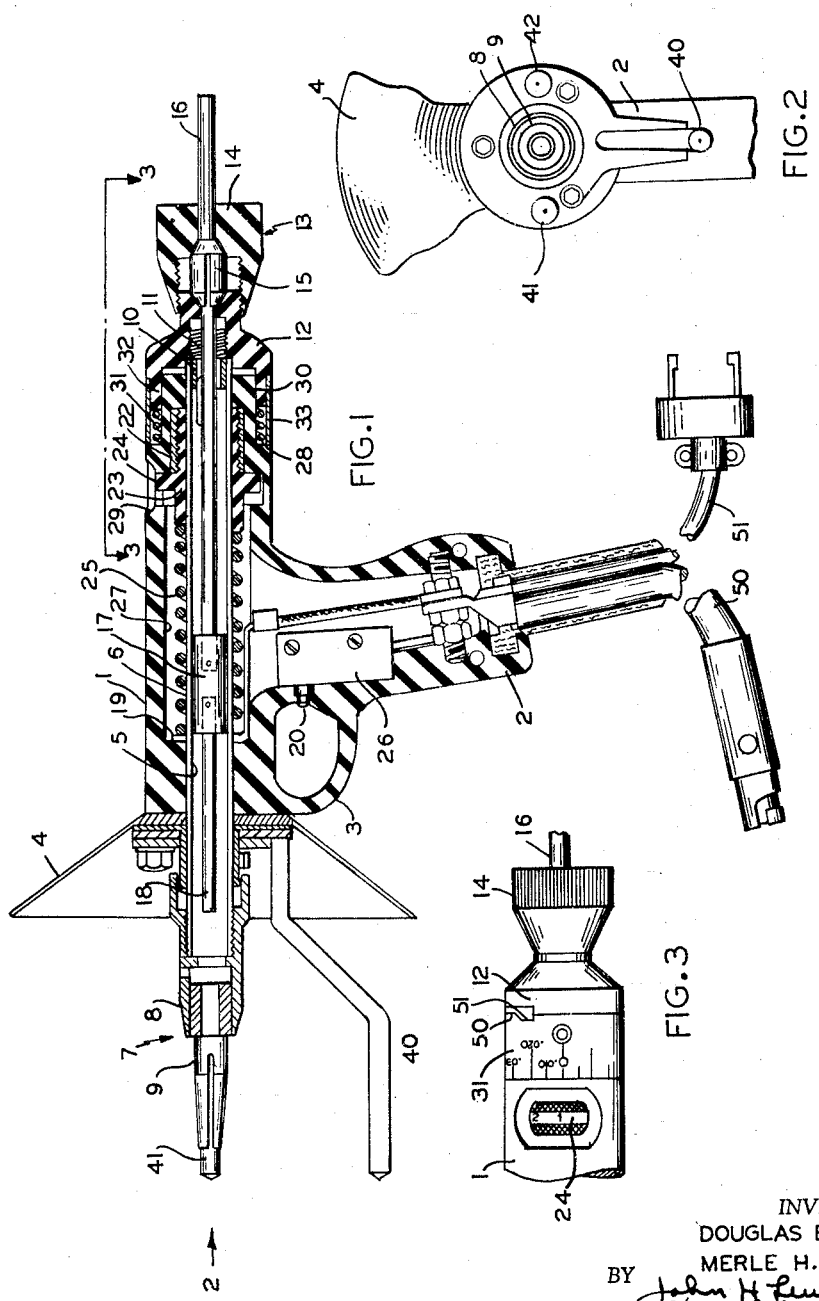
INVENTORS
DOUGLAS E. BULLIS
MERLE H. WALKER
BY May 3, 1960  D. E. BULLIS ET AL  2,935,595
STUD WELDING APPARATUS Filed March 24, 1958  2 Sheets-Sheet 2

INVENTORS
DOUGLAS E. BULLIS
MERLE H. WALKER
BY

United States Patent Office 2,935,595
Patented May 3, 1960

2,935,595

STUD WELDING APPARATUS

Douglas E. Bullis, Ilion, and Merle H. Walker, Mohawk, N.Y., assignors to Remington Arms Company, Inc., Bridgeport, Conn., a corporation of Delaware Application March 24, 1958, Serial No. 723,226

5 Claims. (Cl. 219—98)

This invention lies in the field of electric arc welding and is primarily directed to a portion thereof known as stud welding which is concerned with the end welding of elongated stud or pin elements to other workpieces.

Our improved stud welding apparatus is more particularly related to the known stud welding process in which a fusible slag-forming or flux-forming solid body having a passageway therethrough is placed on a workpiece, a second workpiece or stud is inserted in the passageway against a stop shoulder spaced from the other end of the passageway and the workpiece surface. The stud is firmly held against the stop shoulder in the slag-forming body by means urging the stud toward the workpiece. Electric current is passed through the workpiece, slag-forming body, and stud, to initiate an arc between the stud and workpiece in the passageway through the slag-forming body. When the heat of the arc has deteriorated the stop shoulder in the passageway, the softened stud is brought into contact with the partly molten workpiece by the means urging them together to form the weld. The current is shut off shortly thereafter. Issued patents, 2,510,000, dated May 30, 1950, 2,509,999, dated May 30, 1955, 2,587,251, dated February 26, 1952, 2,643,319, dated June 23, 1953, and 2,755,164, dated July 17, 1956, all in the name of Van Der Willigen, disclose the process with which the present invention is involved.

Ordinarily some form of tool or means is provided for holding the stud and slag-forming element in position, for applying the force to thrust the stud and workpiece into contact with each other when the intervening slag-forming element gives way, and for supplying the current and voltage needed to initiate the arc and heat the workpieces.

It is one object of this invention to provide an improved stud welding tool for carrying out the functions outlined in the preceding paragraph, as well as other objects to be discussed hereinafter, in an efficient, useful and novel manner.

It is a further object to provide an improved stud welding tool with novel means for setting and controlling the stud protrusion. The term stud protrusion means the distance which the end of a stud is projected beneath the surface of the workpiece to complete the weld.

It is a further object to provide an improved stud welding tool with novel means for adjusting the spring means of the tool for projecting the stud against the workpiece to compensate for the weight of the parts in various welding positions.

It is a further object to provide an improved stud welding tool which is economical to produce, requires lesser degree of maintenance, is compact in size and which is simple and efficient in operation.

These and other objects will appear from the following description and appended claims.

We attain the above objects by means, preferred forms of which are illustrated in the accompanying drawings in which:

Figure 1 is a side view taken in longitudinal vertical section of a stud welding tool or gun embodying features of the present invention.

Figure 2 is an end view of the welding tool of Figure 1 with the flash shield and other parts broken away.

Figure 3 is a plan view of the rear portion of the stud welding tool of Figure 1.

Generally speaking the present invention involves an electric arc welding process and equipment for end welding metallic fastener pins or studs to metallic work pieces or surfaces. The process calls for the stud to be positioned adjacent to the workpiece in the desired fastening location, application of a sufficient voltage across the stud and workpiece to initiate an arc between them, and after a definite period of time in which the end of the stud and the impact area on the workpiece are heated by the current to a somewhat molten state, sharply forcing the end of the stud into the impact area on the workpiece to form the weld joint at which time the electric current is cut off.

Figures 5, 6, 7, 8:
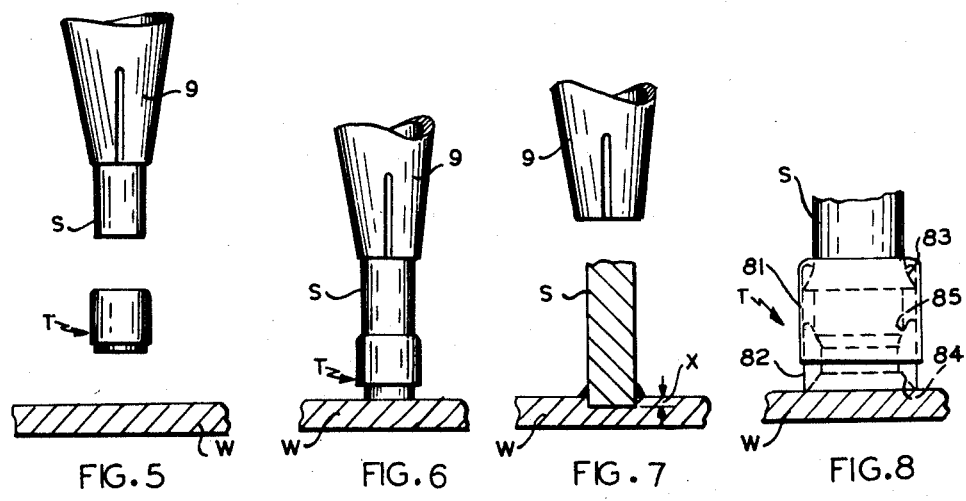
Figure 5 is a partial enlarged side view of the tool chuck assembly holding a stud therein, a slag-forming element, and a workpiece to show the relationship before assembly.
Figure 6 is a partial enlarged side view of the tool chuck assembly holding a stud which is engaged with the slag-forming element and held in operative position against a workpiece.
Figure 7 is a partial side view of the tool chuck assembly withdrawn from the stud which is shown in welded position to the workpiece, stud and workpiece shown in section and stud protrusion distance as indicated.
Figure 8 is a further enlarged side view of a stud and slag-forming element in operative engagement with each other and the workpiece.

More specifically the present invention relates to a known form of this process, as disclosed in the above mentioned patents to Van Der Willigen, in which the time period, during which the arc and current are maintained, is controlled by a fusible flux-forming or slag-forming element T with a passage therethrough positioned between the stud S and the workpiece W. As indicated in the referenced patents this timer or slag-forming element T is capable of conducting electrical current in at least one direction and also by means of a passageway with an abutment is capable of supporting the stud S which is backed up by a spring means forcing the stud S against the timer element T and toward the workpiece W. The relative positions of these elements with the stud held in the chuck of the welding tool are disclosed in Figures 5, 6, 7 and 8. The dimensions indicated by the reference character X in Figure 7 represents the stud "protrusion" into the workpiece. This protrusion distance may be varied as required in a manner fully disclosed at another point in this specification. Continuing with a general description of the process with which the present invention is related, upon application of the voltage across the stud S, timer element T and workpiece W, a current is at first conducted through the slag-forming timer element T and later directly between the stud S and workpiece W, in the form of an arc which is set up in the central passageway in the timer element T. The arc accomplishes two things principally, the first is the softening of the end of the stud nearest the workpiece and also of the impact area on the workpiece; the second is the deterioration of the flux-forming timer element T to the point where it can no longer prevent the spring-urged stud from moving into contact with the impact area on the workpiece. The impact of the softened end of the stud S into the softened impact area on the workpiece W results in the fusing of the stud to the workpiece forming the weld. Simultaneously with stud movement, or shortly thereafter, the current is cut off to complete the cycle of operation.

The workpiece term referred to means any metallic surface or member to which it is desired to attach a stud or fastener pin which is also metallic in composition.

The studs or fastener pins are metallic and may be of any desired form, the most usual being cylindrical, and sometimes having screw threads at one end thereof.

The slag-forming or flux-forming timer element T, hereinafter referred to as the timer element, is an important unit in carrying out the welding process. An enlarged showing of a timer element in cooperative association with the end of a stud is shown in Figure 8.

The main component of the timer element is the solid refractory material portion 82 of conductive or semiconductive composition. Examples of this composition are known and disclosed in the above referenced patents. The portion of refractory material is provided with a central passageway 84 therethrough. In the passageway is formed a supporting shoulder 85 or abutment for receiving and supporting one end of a stud S. A paper or cardboard collar 81 is secured to the exterior of refractory material portion 82 of the timer. The extremity of said collar being folded inwardly through an angle of about 180 degrees forms a means 83 for frictionally securing the timer and collar to the end of a stud in operative position for carrying out the welding process. The timer assembly T is secured to the end of the stud S so that the axis of the stud is aligned with the passageway 84 through the timer and the end of the stud S is engaged with the shoulder 85 in this passageway to limit movement of the stud into the passageway. The timer element conducts the current initially, assists in initiating the arc between the stud end and the workpiece, and after the arc is set up contains the arc and performs a shielding function during the welding operation. However the most important function performed by the timer element is its controlled deterioration by the arc to the point at which the shoulder 84 disappears to release the stud to strike against the workpiece. By carefully controlling the composition and dimensions of the timer element, for a given voltage, the time of duration of the arc and consequently the degree of heating of the stud and workpiece can be very accurately controlled without any additional or exterior timing or control means to make proper welds.

Turning now to the equipment or tool by which the process is carried out, this unit generally consists of a chuck or holding device for one end of the stud, means for forcing the stud toward the work surface, means for allowing support and manipulation by an operator, and the necessary circuit means to apply the voltage and supply the current required to carry out the welding cycle.

The preferred embodiment of the tool of our invention is best shown in Figures 1, 2, 3 and 4 of the drawings.

The stud welding tool or gun comprises a housing of dielectric material which is provided with a tubular portion 1 and a grip portion 2. A trigger guard 3 is also provided. The tubular portion 1 of the tool housing is provided with an axial passageway 5 therethrough, having an interior enlarged portion 27. Slidingly mounted in the passageway 5 is an elongated tube element 6. Mounted on the forward end of tube 6 is a chuck assembly 7. At the rear end of tube 6 is secured a threaded tube extension member 10. Mounted on the threaded portion 11 of extension member 10 is cap element 12 which is mounted on the rear portion of tubular housing 1 for limited axial sliding motion.

A flash shield 4 and a tripod assembly having legs 40, 41 and 42 for supporting the tool against a workpiece are mounted at the forward end of housing portion 1.

The chuck element 9 for frictionally engaging the studs is itself frictionally held in chuck supporting element 8. Element 8 is threadedly secured to the forward end of tube 6. A metallic collar 19 is secured to the exterior of tube 6 by suitable means such as brazing and is provided with an elongated prong which is connected through a flexible conductor to the main power cable 50.

The trigger element 20 actuates an electrical switch 26 which is in the control circuit carried by conduit 51.

Slidably fitted in the interior of tube 6 is a coupling element 17 which supports a stud back up rod 18 and an extension rod 16 for providing a variable positive stop to limit the distance that a stud may be inserted into chuck element 9. The extension rod 16 projects rearwardly through cap element 12 and clamping assembly 13. The clamping assembly functions in a well known manner through elements 12, 14 and 15 to secure the rod extension in the desired position to back up studs inserted in the chuck element.

A bushing 22 is secured in the interior of housing portion 1 against inwardly extending flange structure 24. The interior of bushing 22 is threaded to receive a threaded portion of the spring tension adjusting sleeve 23. A helical coil spring 25 is compressed between sleeve 23 and collar 19 which is secured to tube 6. As can be seen from the drawings spring 25 urges the tube 6, chuck assembly 7 and cap element 12 forwardly. It will be seen that rotation of sleeve 23 by manually actuating flanged portion 24 extending through aperture 29 in the housing, will move the sleeve axially in the housing to vary the compression of spring 25.

The rear end of housing portion 1 is provided with an end section 30 of reduced diameter upon which is slidably received the forwardly extending side walls of cap element 12. A sleeve 31 is rotatably supported on an annular cutout portion on the periphery of the forwardly extending side walls of cap element 12 and is held by spring 25 in engagement with abutment 28 on housing portion 1.

Figure 4:
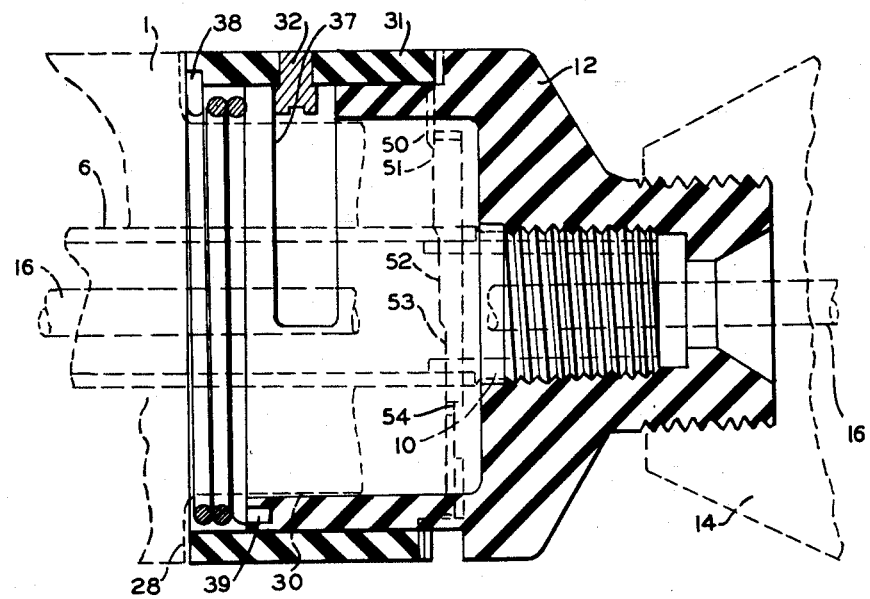
Figure 4 is an enlarged side view shown in longitudinal vertical section of the assembly of parts by which the stud protrusion distance into the workpiece is adjusted and controlled. Other associated parts of the tool are shown in dotted lines with parts broken away for greater clarity.

The function of sleeve 31 will be more clearly explained by reference to Figure 4. As has been pointed out, cap 12 is secured to the rear end of tube 6 by means of threaded tube extension 10 and surrounds a portion 30 of reduced diameter of the housing 1. Sleeve 31 is mounted for limited rotary movement on the forwardly extending side walls of the cap 12. Sleeve 31 is positioned between cap 12 and abutment 28 in the housing 1 as shown. A helical torsion spring is secured to sleeve 31 at 38 and to cap 12 at 39 and acts to rotate the rotatable sleeve 31 to a given position relative to the fixed housing 1 and fixed cap 12. The rearward end surface of sleeve 31 is provided with a plurality of axially displaced steps or cam surfaces 50, 51, 52, and 53 as shown in Figures 3 and 4. The forward edge of cap 12 which is held against the sleeve 31 by spring 25 is provided with a projecting abutment 54 for engaging the steps or cam surfaces 50, 51, 52 and 53, and a cutaway portion. As can be seen from the drawings rotation of sleeve 31 brings the steps 50, 51, 52 and 53 sequentially into engagement with projecting abutment 54 on cap 12 to position the cap 12 at various positions axially spaced from sleeve element 31 and housing 1. Of course this also positions tube 6 and chuck 9 at different axial positions with respect to housing 1. In other words the steps 50, 51, 52 and 53 act as a series of selectable stops to limit the distance that the spring 25 can move the chuck 9 and cap 12 forwardly with respect to the housing 1.

A radially protruding pin or screw 32 is positioned in sleeve 31 and rides in a slot in the sidewalls of cap 12 to act as a rotation limiting stop for sleeve 31. It will be noted that rotational adjustment of sleeve 31 to bring the desired step into engagement with cap 12 will tension torsion spring 33 so that the spring tends to return the sleeve 31 to its vertical position. However, the characteristics of spring 33 are such that the frictional forces caused by spring 25 urging cap 12 against sleeve 31 and sleeve 31 against abutment 28 are sufficient to prevent the torsion spring from returning sleeve 31 to its equilibrium or neutral position. This arrangement permits the selection of the desired stud protrusion distance into the workpiece as will be more fully explained later.

The conduits 50 and 51 are led from a power supply unit usually at some distance from the work location. Visually the main power conduit 50 is connected to the secondary of a supply transformer while the control conduit 51 is a part of a lower voltage circuit which actuates a solenoid to operate the main power control switch in the supply transformer primary winding. The closing of the trigger switch 26 in the control circuit actuates the solenoid or relay to energize the power transformer primary windings which applies the main power output from the transformer secondary winding to the tool and stud to be welded. Release of the trigger switch 26 cuts off power to the tool.

The operation of the tool as described in connection with Figures 1 through 4 will now be described through one welding cycle.

Initially the trigger switch 26 in the control circuit is open as is the switch it controls in the main power supply. The compressive force of spring 25 is set by manipulating rotatable sleeve 23 by means of portion 24 thereof which extends through aperture 29 in housing 1. Usually only three settings are available; one for using the tool on a floor surface, one for overhead surfaces, and the third for vertical surface work. Adjustment of the spring 25 is made to compensate for the weight of the spring-projected parts so that as nearly as possible the studs are projected against the workpiece surface with equal force regardless of the position of the tool and direction of gravity with respect thereto.

Next, the desired protrusion distance of the stud end into the workpiece is set. This is done by rotating sleeve 31 until the desired cam stop engages protruding abutment 54 on cap 12. This moves the cap 12 together with tube 6 and chuck axially rearward a given distance which is equal to the desired stud protrusion distance. The tendency of torsion spring to return the sleeve 31 to the neutral position (no stud protrusion) is successfully opposed by the frictional forces caused by spring 25 forcing cap 12 and sleeve 31 against abutment 28 on housing 1.

Next, a stud is placed in the chuck 9, the tool placed against the workpiece in the desired position for welding the stud, and the stud axially positioned in the chuck so that its lower end and the end of the tripod legs lie in one plane without depressing spring 25. The stud is backed up by moving the rod 18 into abutting engagement therewith and securing rod 16 in place by manipulation of clamping assembly 13.

A timer element is now secured to the lower end of the stud by frictional engagement of the timer element in turned paper collar so that the passage in the timer is in alignment with the stud axis and the bottom of the stud lies against the shoulder in the passageway through the timer element.

The tool is gripped in the operator's hand and placed against the workpiece in position to affix the stud as desired. Pressure of the tool against the workpiece will displace the chuck, tube 6, cap 12 and spring 25 rearwardly with respect to the gun housing 1 a distance equal to the height of the timer stop abutment 85 above the workpiece surface. Upon release of the pressure of cap 12 against sleeve 31 the torsion spring 33 returns the sleeve 31 to its neutral position which will now enable the cap 12 to be moved by spring 25 to the original limit of its forward movement. This will permit protrusion of the stud into the workpiece by the distance that cap 12 was initially displaced rearwardly by the cam step on sleeve 31.

With the stud and tool thus held against the work surface, the trigger 20 is actuated to close switch 26 in the control circuit and cause power to be applied to the stud.

The initiation of the arc and subsequent projection of the stud against the workpiece at the proper time to form a satisfactory weld are set forth in detail in preceding portions of the specification.

When the timer element deteriorates to the point at which spring 25 projects the tube 6, chuck, and stud against the workpiece, the trigger is released to open switch 26 and remove power from the tool and stud. The tool is withdrawn from the stud. The timer element is substantially destroyed by the process and the remnants are easily brushed away.

It will be seen that a simple and efficient tool of improved design has been achieved, one in which the spring tension may be quickly and easily set as can the desired stud protrusion distance. The stud protrusion setting automatically returns to zero with each actuation of the tool and is easily reset by simple manipulation of the tool.

Index marks are provided on elements 24 and 31 so that the desired settings can easily be made by the operator.

It will be understood by those skilled in the art upon a study of this disclosure, that our invention permits of various modifications and may be embodied in devices other than that particularly illustrated and described, without departing from the essence of our invention and within the scope of the following claims.

We claim:

1. A portable arc welding tool for welding metallic studs to metallic workpieces, said tool comprising a housing, an assembly movably mounted in said housing a stud-engaging chuck assembly mounted on said movable assembly, workpiece engaging members mounted on said housing, resilient means urging said movable assembly and chuck assembly toward a workpiece engaging position, electrical means connected to said movable assembly for applying electrical power thereto, control means for said electrical means, a stop abutment selectively movable from a given position and mounted on said housing for engagement with said movable assembly to provide a selectively adjustable limit stop for movable assembly movement caused by said resilient means, and manually adjustable means for varying the effective force of said resilient means to compensate for the effect of gravity on the moving parts when operating the tool in various positions.

2. A portable arc welding tool for welding metallic studs to metallic workpieces, said tool comprising a housing, an assembly movably mounted in said housing a stud-engaging chuck assembly mounted on said movable assembly, workpiece engaging members mounted on said housing, resilient means urging said movable assembly and chuck assembly toward a workpiece engaging position, electrical means connected to said movable assembly for applying electrical power thereto, control means for said electrical means, a stop abutment movable from a given position and mounted on said housing for engagement with said movable assembly to provide an adjustable limit stop for movable assembly movement caused by said resilient means, and means for varying the effective force of said resilient means to compensate for the effect of gravity on the moving parts when operating the tool in various positions, and means for returning said movable stop abutment to a given position automatically during each operating cycle of the tool.

3. A portable tool for arc welding metallic fastener pins to metallic workpiece surfaces, comprising in combination, movable means for supporting a fastener pin in a desired position adjacent to a workpiece, a housing means on which said movable means is mounted, said housing means having means for engaging the workpiece surface, means urging said movable means toward a workpiece surface, stop means in said housing adjustable from a given position to a series of positions to engage said movable means to limit the travel thereof toward the workpiece surface, means in cooperation with said stop means operative to return said stop means to said given position automatically during each operation of the tool, electrical conduit means in said housing for supplying an electrical voltage across the stud and workpiece to initiate and sustain an arc therebetween, and control means for said conduit means.

4. A stud welding tool of the arc welding type which utilizes an arc initiating fusible slag-forming timer element positioned between a stud and the workpiece to which the stud is to be welded, comprising in combination a housing, a stud-holding means movably mounted in said housing, resilient means mounted in said housing urging said stud-holding means toward a workpiece to which the stud is to be welded, fixed workpiece engaging portions on said housing, electrical circuit means for applying a voltage to said stud, control means for said circuit means, a stop means in said housing mounted in the path of said stud-holding means and adjustable from a given position selectively to a series of positions to engage said stud holding means to limit movement thereof toward the workpiece and hence the protrusion distance of the stud held thereby into the workpiece surface, and means cooperating with said stop means to return said stop means to said given position upon completion of the operation of said tool through a welding cycle.

5. A portable tool for arc welding metallic fastener pins to metallic workpieces, comprising in combination, a housing, movable fastener pin holding means mounted in said housing, said housing having workpiece engaging surfaces, a second means manually adjustable in said housing cooperating with said fastener pin holding means to urge said fastener pin holding means toward said workpiece engaging surface to impact a fastener pin held thereby against the workpieces with a constant force regardless of the attitude of said tool, a third selectively adjustable means cooperating with said second means for selectively controlling the protrusion distance of the fastener pin into the workpiece, electrical means for applying electrical voltage across the fastener pin and workpiece, and control means for said electrical means.

References Cited in the file of this patent

UNITED STATES PATENTS

| | | |
|---|---|---|
| 2,622,179 | Butterfield | Dec. 16, 1952 |
| 2,745,933 | Puckett | May 15, 1956 |